United States Patent
Ranmuthu et al.

(10) Patent No.: US 6,522,492 B1
(45) Date of Patent: Feb. 18, 2003

(54) WRITE TO READ SWITCHING TIME TRIM CIRCUIT

(75) Inventors: Indumini Ranmuthu, Plano, TX (US); Echere Iroaga, Garland, TX (US); Ashish Manjrekar, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/707,877

(22) Filed: Nov. 7, 2000

(51) Int. Cl.[7] .............................. G11B 5/02; G11B 5/09; G11B 15/12
(52) U.S. Cl. ............................. 360/67; 360/46; 360/61; 360/62
(58) Field of Search .............................. 360/46, 67, 68, 360/61, 62

(56) References Cited

U.S. PATENT DOCUMENTS 5,278,700 A * 1/1994 Sutliff et al. ............... 360/46
6,157,241 A * 12/2000 Hellums ..................... 327/525
6,169,393 B1 * 1/2001 Hashimoto ................. 323/354

\* cited by examiner

Primary Examiner—Regina N. Holder
(74) Attorney, Agent, or Firm—W. Daniel Swayze, Jr.; W. James Brady; Frederick J. Telecky, Jr.

(57) ABSTRACT

An offset circuit to correct an offset between differential signals includes a read circuit to read the differential signals, a circuit to measure the offset of the differential signals, and a programmable trim circuit to compensate for the offset of said differential signals.

7 Claims, 3 Drawing Sheets

WRITE TO READ SWITCHING TIME TRIM CIRCUIT

FIELD OF THE INVENTION

The present invention relates to disk circuits and, more particularly, to a method and apparatus for reading information from a magnetic disk.

BACKGROUND OF THE INVENTION

Conventional magnetic storage devices include a magnetic transducer or "head" suspended in close proximity to a recording medium, for example a magnetic disk, having a plurality of concentric tracks. The transducer is supported by an air-bearing slider mounted to a flexible suspension. The suspension, in turn, is attached to a positioning actuator. During normal operation, relative motion is provided between the head and the recording medium as the actuator dynamically positions the head over the desired track. The relative movement provides an air flow along the surface of the slider facing the medium, creating a lifting force. The lifting force is counterbalanced by a predetermined suspension load so that the slider is supported on a cushion of air, Air flow enters the "leading" end of the slider and exits from the "trailing" end. This air is used to prevent the head from contacting the disk, resulting in damage.

Writing data is typically performed by applying a current to the coil of the head so that a magnetic field is induced in an adjacent magnetic permeable core, with the core transmitting a magnetic signal across any spacing and protecting coating of the disk to magnetize a small pattern or digital bit of the medium within the disk. Reading of the information in the disk is performed by sensing the change in magnetic field of the core as the transducer passes over the bits in the disk. The changing magnetic field induces a voltage or current in the inductively coupled coil. Alternatively, reading of the information may be accomplished by employing a magneto-resistive (MR) sensor, which has a resistance that varies as a function of the magnetic field adjacent to the sensor. In order to increase the amplitude and resolution in reading the bits, the MR sensor is typically positioned on the slider as close to the disk as possible. Connected to these heads or sensors are read circuits which amplify the recorded data and eliminate noise. However, recently, some manufacturers of these MR sensors have switched from MR heads which employ a constant current source to MR heads which employ a constant voltage source.

A typical pre-amplifier for reading information from the read head includes a differential pair of output signals corresponding to reading information from each side of the read head. A problem with this differential output signal is the offset between the differential output signal. Importantly, this offset is directly related to the write/read time which is the time to transfer from a write state to a read state. More particularly, if the offset is great, the write to read time is long and if the offset is small the write to read time is small. Consequently, it has been necessary to provide a circuit to compensate for this offset.

FIG. 2 illustrates such an offset compensation circuit where a current mirror circuit 202 provides current to the base of transistor 226. The collector to emitter current of transistor 226 which is controlled by this base current is the current through the MR head 228. The voltage across resistor 121 is compared with the voltage across resistor 224 by transconductance device 230 and the current output from transconductance device 230 is used to form a voltage on capacitor 232. Since $G_M$ is equal to $I_E$ divided by $V_{IN}$, and since the capacitor 232 is typically large because it was external to the chip, $G_M$ could be large to result in small offset voltages, namely $V_{IN}$.

However, since it is desirable to have capacitor 232 move on chip, this requires a smaller capacitor 232 and consequently $G_M$ should be correspondingly smaller. However, a small $G_M$ dictates that the offset voltage will be large in order to satisfy the above equation. Larger offset voltages as discussed above increases the write to read time and is correspondingly undesirable. Thus, there is a need for a write to read switching time trim circuit which will take into consideration the effect of placing the above-mentioned capacitor on chip and the corresponding effects of having the capacitor a relatively-small size. It is important to maintain a small write to read time, and as a consequence, it is important to maintain a minimum offset between the differential output signals.

SUMMARY OF THE INVENTION

The present invention provides a read to write switching time trim circuit that minimizes offset between differential outputs. More particularly, the write to read switching time trim circuit of the present invention minimizes the read to write time required when a hard disk drive system is switching between write mode to a read mode.

DETAILED DESCRIPTION OF THE PRESENT INVENTION

The following invention is described with reference to figures in which similar or the same numbers represent the same or similar elements. While the invention is described in terms for achieving the invention's objectives, it can be appreciated by those skilled in the art that variations may be accomplished in view of these teachings without deviation from the spirit or scope of the invention.

Figure 3:
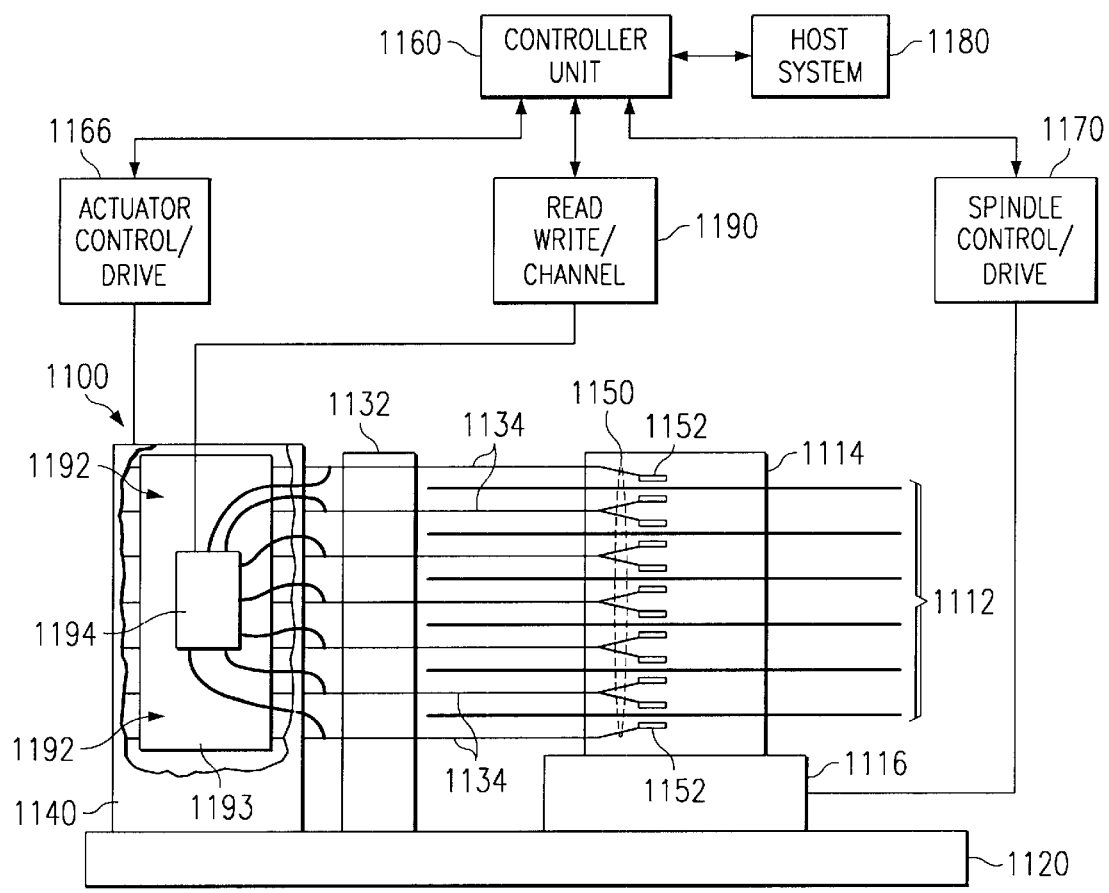
FIG. 3 illustrates a side view of the system of the present invention.
Figure 4:
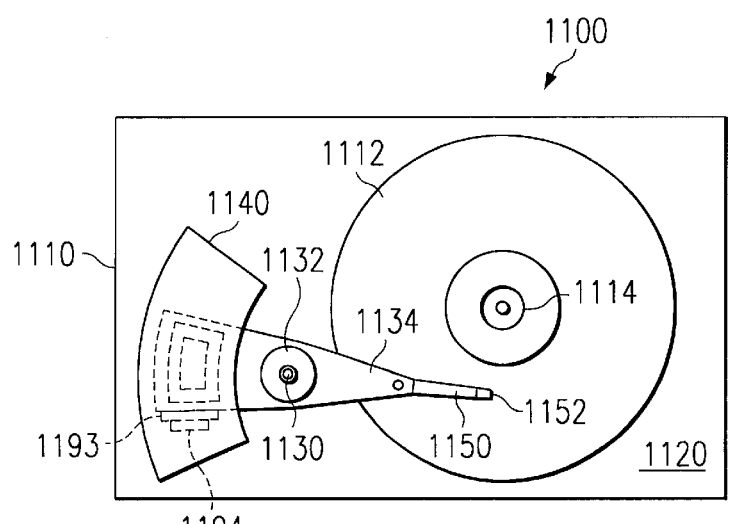
FIG. 4 illustrates a top view of the system of the present invention.

FIGS. 3 and 4 show a side and top view, respectively, of the disk drive system designated by the general reference 1100 within an enclosure 1110. The disk drive system 1100 includes a plurality of stacked magnetic recording disks 1112 mounted to a spindle 1114. The disks 1112 may be conventional particulate or thin film recording disk or, in other embodiments, they may be liquid-bearing disks. The spindle 1114 is attached to a spindle motor 1116 which rotates the spindle 1114 and disks 1112. A chassis 1120 is connected to the enclosure 1110, providing stable mechanical support for the disk drive system. The spindle motor 1116 and the actuator shaft 1130 are attached to the chassis 1120. A hub assembly 1132 rotates about the actuator shaft 1130 and supports a plurality of actuator arms 1134. The stack of actuator arms 1134 is sometimes referred to as a "comb." A rotary voice coil motor 1140 is attached to chassis 1120 and to a rear portion of the actuator arms 1134.

A plurality of head suspension assemblies 1150 are attached to the actuator arms 1134. A plurality of inductive transducer heads 1152 are attached respectively to the suspension assemblies 1150, each head 1152 including at least one inductive write element. In addition thereto, each head 1152 may also include an inductive read element or a MR (magneto-resistive) read element. The heads 1152 are positioned proximate to the disks 1112 by the suspension assemblies 1150 so that during operation, the heads are in electromagnetic communication with the disks 1112. The rotary voice coil motor 1140 rotates the actuator arms 1134 about the actuator shaft 1130 in order to move the head suspension assemblies 1150 to the desired radial position on disks 1112.

A controller unit 1160 provides overall control to the disk drive system 1100, including rotation control of the disks 1112 and position control of the heads 1152. The controller unit 1160 typically includes (not shown) a central processing unit (CPU), a memory unit and other digital circuitry, although it should be apparent that these aspects could also be enabled as hardware logic by one skilled in the computer arts. Controller unit 1160 is connected to the actuator control/drive unit 1166 which is in turn connected to the rotary voice coil motor 1140. A host system 1180, typically a computer system or personal computer (PC), is connected to the controller unit 1160. The host system 1180 may send digital data to the controller unit 1160 to be stored on the disks, or it may request that digital data at a specified location be read from the disks 1112 and sent back to the host system 1180. A read/write channel 1190 is coupled to receive and condition read and write signals generated by the controller unit 1160 and communicate them to an arm electronics (AE) unit shown generally at 1192 through a cut-away portion of the voice coil motor 1140. The A/E unit 1192 includes the trim circuit of the present invention. The AE unit 1192 includes a printed circuit board 1193, or a flexible carrier, mounted on the actuator arms 1134 or in close proximity thereto, and an AE module 1194 mounted on the printed circuit board 1193 or carrier that comprises circuitry preferably implemented in an integrated circuit (IC) chip including read drivers, write drivers, and associated control circuitry. The AE module 1194 is coupled via connections in the printed circuit board to the read/write channel 1190 and also to each read head and each write head in the plurality of heads 1152.

Figure 1:
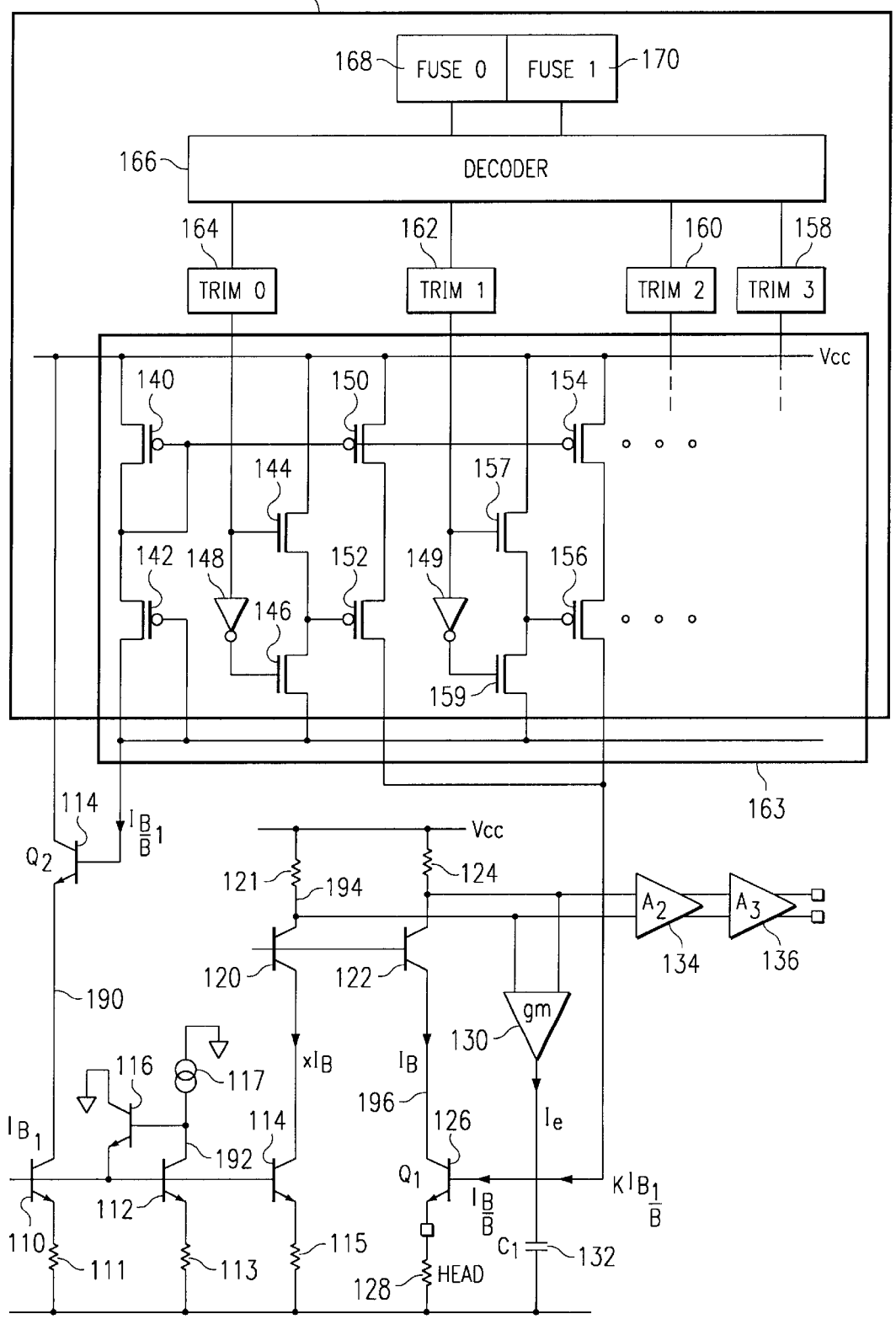
FIG. 1 illustrates a write to read switching trim circuit of the present invention.
Figure 2:
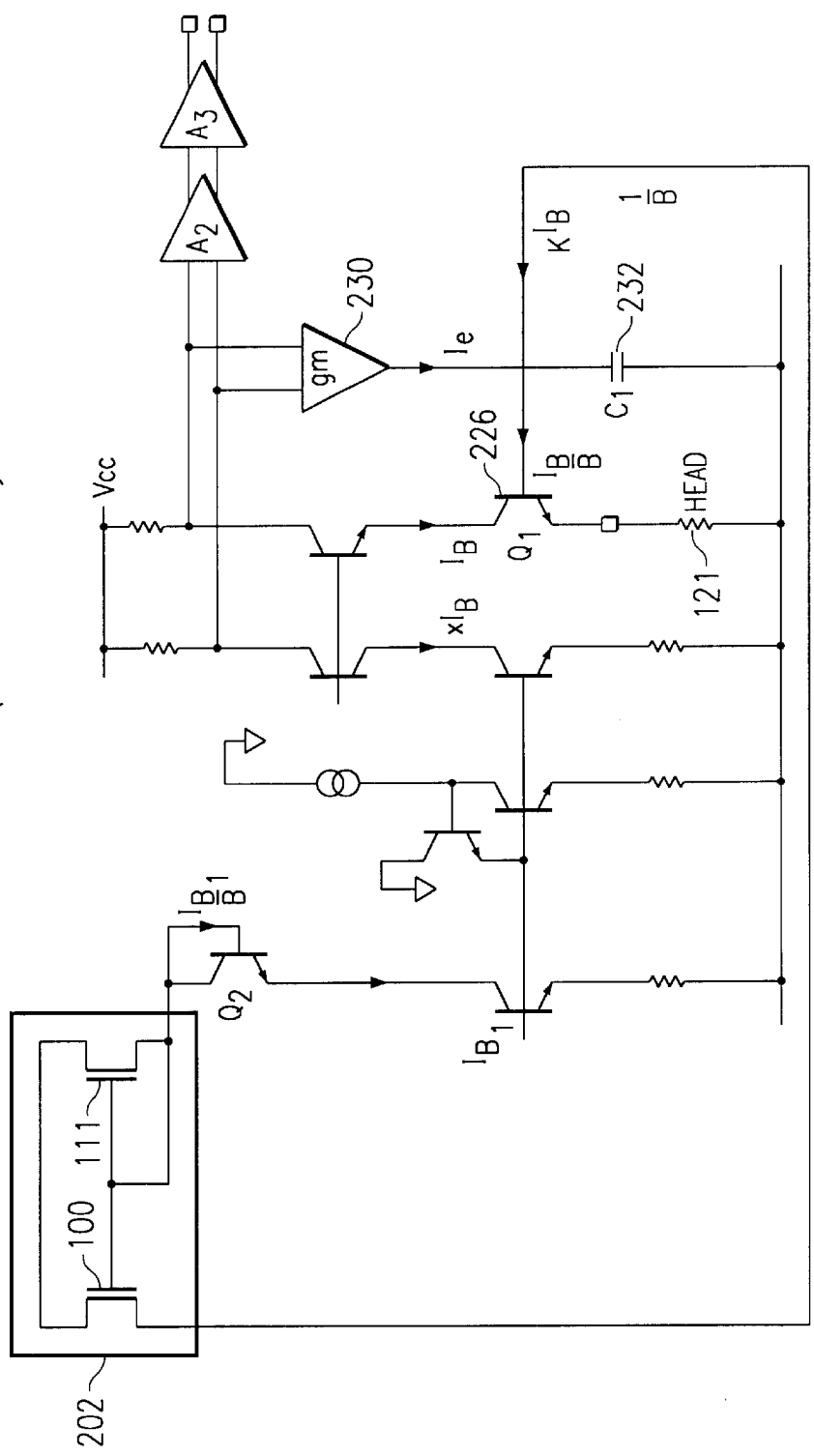
FIG. 2 illustrates a write to read switching time trim circuit.

Referring to FIG. 1, the write to read switching time trim circuit of the present invention includes four current paths. The current paths are a first current path 190, a second path 192, a third current path 194 and a fourth current path 196. The first current path includes transistor 118 having a collector connected to voltage $V_{CC}$ and an emitter connected to a collector of transistor 110. The emitter of the transistor 110 is connected to resistor 111. The second current path 192 includes a current generator 117 connected at one end to voltage $V_{CC}$ and connected to collector of transistor 112. The base of transistor 116 is connected to current source 117. Additionally, the collector of transistor 116 is connected to voltage $V_{CC}$ while the emitter is connected to the base of transistor 112 and to the base of transistor 110. The emitter of transistor 112 is connected to resister 113 while the base of transistor 112 is connected to the base of transistor 110. The emitter of transistor 112 is connected to resistor 113 and the other end of resistor 112 is connected to the other end of resistor 111. The third current path 194 includes a resistor 121 having one end of resistor 121 connected to voltage $V_{CC}$. The other end of resistor 121 is connected to gain stage 134 and connected to the collector of transistor 120. The emitter of transistor 120 is connected to the collector of transistor 114 and the emitter of transistor 114 is connected to the resistor 115. The other end of resistor 115 is connected to resistor 113 and resistor 111 and connected to ground. The fourth current path 196 includes a resistor 124 connected to voltage $V_{CC}$. The other end of resistor 124 is connected to another input of gain stage 134 and connected to the collector of transistor 122. The base of transistor 122 is connected to the base of transistor 120. The emitter of transistor 122 is connected to the collector of transistor 126. The emitter of transistor 126 is connected to resistor 128 which is the resistance corresponding to the head, more particularly, the MR head of an HDD system the head reads the differential signal. Additionally connected to one end of resistor 121 and one end of resistor 124 is transconductance device 130. To measure the voltage between the voltage drop of resistor 121 and the voltage drop of resistor 124 which is offset, the transconductance device 130 is connected to capacitor 132 which is in turn connected to the base of transistor 126. Transconductance device 130 provides current $I_C$ based on the difference in voltage drop across resistor 121 and the voltage drop across resistor 124 to capacitor 132 and correspondingly to the base of transistor 126 where transistor 126 allows more current to flow in the fourth current path 196 which increases the voltage drop across resistor 124 correcting the offset. When the voltage difference between the voltage drop across resistor 121 and the voltage drop across resistor 124 is negative, the transconductance circuit 130 generates less current. The voltage across capacitor 132 is reduced and less current flows in the fourth current path 196 as a result of transistor 126. The reduced current lowers the voltage drop across resistor 124 again correcting this offset. The trim circuit 161 sets the bias current by raising or lowering the current flow in the first current path 190. Since the bases of transistors 110, 112 and 114 are connected together, the current $I_{B1}$ in the first current path 190 is shunt from the first current path 190 to the second and third current paths 192 and 194, respectively, based on the relative respective ratio of the resistance of R111/R112 for the second current path 192 and the resistance of resistor R111/the resistance of resistor 113 for the third current path 194 and the resistance of resistor R111 divided by the resistance of resistor R115 for the fourth current path 146. Thus, in operation, the current $I_B$ that flows through the fourth current path 196 is determined by the current into the base of transistor 126. In a similar fashion, the current in the third current path 194 corresponds to the current into the base of transistor 118. Typically, it is difficult to form transistor 126 and transistor 118 so that the transistor 118 and transistor 126 are similar so an additional amount of current must be added or subtracted to the fourth current path 196 to correspond to differences between transistor 126 and transistor 118.

In order to accommodate these differences a trim circuit 161 is employed. This trim circuit 161 is programmable and used typically within a factory environment to compensate for differences in current between the third current path 192 (and the first current path 190) and current 163 and the fourth current path 196. The programmable trim circuit 161 employs a current mirror which adds and subtracts current input into the base of transistor 118. This is accomplished by adding or subtracting current paths within the current mirror 163 so that more or less current is added or subtracted to be mirrored by the current mirror circuit 163. The current mirror 163 increases or decreases the mirrored current to more closely balance the current between first current path 190 and fourth current path 196. The base of transistor 118 is connected to the drain of PFET 142 to form an output for the current mirror 163. The source of PFET 142 is connected to the drain and gate of PFET 140, and the source of PFET 140 is connected to voltage $V_{CC}$. The gate of PFET 142 is connected to the base of transistor 118. PFET 142 and PFET 140 sets up the bias voltage for the current mirror 163. PFET 150 and PFET 152 form one of the variable number of current paths for current mirror 163. The amount of current that PFET 150 and PFET 152 conducts depends on the drain length of PFET 150 and PFET 152. Additionally, voltage $V_{CC}$ is connected to the source of PFET 150. The drain of PFET 150 is connected to the source of PFET 152 and the drain of PFET 152 is connected to the base of transistor 126. The gate of PFET 150 is connected to the gate of PFET 140. The gate of PFET 152 is connected to the source of the drain of NFET 144 and NFET 146. The drain of NFET 144 is connected to voltage $V_{CC}$ while the source of NFET 146 is connected to the base of transistor 118. The gate of NFET 146 is connected to the output of inverter 148. The gate of NFET 144 is connected to the input of inverter 148 and connected to trim zero circuit 164. The trim zero circuit 164 is connected to decoder circuit 166. The decoder circuit 166 has a first input connected to fuse zero circuit 168 and a second input connected to fuse one circuit 170. The trim zero circuit 164 controls whether PFET 150 and PFET 152 add a current path to the current mirror 163 by blowing a fuse internal to trim zero circuit 164. The amount of current that PFET 150 and PFET 152 add to the current mirror depends on the drain size of PFET 150 and PFET 152. PFET 150, PFET 152, NFET 144 and NFET 146 and inverter 148 form a cell to add current to the current mirror 163. The trim zero circuit 164 includes a fuse which is blown or not blown in order to activate or deactivate the cell including the PFETs 150 and 152. Additional cells are constructed in a similar fashion such as the cell including PFET 154, PFET 156, NFET 157, NFET 159 and inverter 149. These are controlled by a trim one circuit 162. Additional cells could be constructed in a similar fashion or slightly different fashion with the purpose of adding more current to the current mirror or subtracting current from the current mirror. It should be understood that the drain size of PFET 154 and PFET 156 could be of different size in order to have a different amount of current added to the current mirror. Consequently, a programmable current mirror is formed. The amount of offset is determined and the amount of current that is received to the base of transistor 118 to compensate for the offset is determined. The proper trim circuit, for example, trim Ø circuit 164 or trim 1 current 162 is activated to generate the current from the mirror current by the decoder circuit. The fuse zero 168 and fuse one circuit 170 sends a coded signal to decoder 166. The decoder 166 decodes the coded signal from fuse zero circuit 164 and fuse one circuit 170 in order to control trim zero circuit 164, trim one circuit 162, trim two circuit 170 and trim three circuit 158. The trim circuits mentioned control individual cells to control the different amounts of currents of the programmable current mirror. Thus, the circuit can be trimmed in the factory in order to eliminate offsets and any offsets which develop in operation on the fly are corrected by transconductance circuit 130 adding current to the base of transistor 126.

What is claimed is:

1. An offset circuit to correct an offset between differential signals generated from a disk, comprising:
   a read circuit to read said differential signals from said disk;
   a circuit to measure the offset of said differential signals read from said disk; and
   a programmable trim circuit to compensate for said offset of said differential signals read from said disk.

2. An offset circuit to correct an offset between differential signals as in claim 1, wherein said programmable trim circuit is a programmable current mirror.

3. An offset circuit to correct an offset between differential signals as in claim 2, wherein said programmable trim circuit adds or subtracts current paths to conduct more or less current to compensate for said offset of said differential signals.

4. An offset circuit to correct an offset between differential signals as in claim 1, wherein said circuit to measure said differential signal includes a transconductance circuit.

5. An offset circuit to correct an offset between differential signals as in claim 4, wherein said transconductance circuit measures a voltage drop across a first resistor and a second resistor.

6. An offset circuit to correct an offset between differential signals as in claim 4, wherein said programmable trim circuit includes a decoder circuit to control a fuse current.

7. An offset circuit to correct an offset between differential signals as in claim 6, wherein said fuse current controls a programmable current mirror to conduct more or less current to compensate for said offset.

\* \* \* \* \*